United States Patent Office 3,847,844
Patented Nov. 12, 1974

3,847,844
PROCESS FOR MAKING FIRE-RETARDANT POLY-
URETHANE FOAM USING CRUDE 4,4,4-TRI-
CHLORO-1,2-EPOXYBUTANE
Stephen Fuzesi, Hamden, Conn., Milton Lapkin, Sudbury,
Mass., and Roger J. Polak, Severna Park, Md., as-
signors to Olin Corporation
No Drawing. Continuation-in-part of application Ser. No.
113,761, Feb. 8, 1971, which is a continuation-in-part
of application Ser. No. 872,359, Oct. 29, 1969, which
in turn is a continuation-in-part of application Ser. No.
648,228, June 23, 1967, all now abandoned. This ap-
plication Oct. 23, 1973, Ser. No. 408,637
Int. Cl. C08g 22/46, 22/16
U.S. Cl. 260—2.5 AS     15 Claims

ABSTRACT OF THE DISCLOSURE

Flame retardant polyurethane foam is obtained more economically by utilizing a selected crude 4,4,4-trichloro-1,2-epoxybutane in the preparation of a chlorinated polyether polyol used in foam forming.

This invention is a continuation-in-part of co-pending U.S. application Ser. No. 113,761, filed Feb. 8, 1971, and now abandoned. The latter application was in turn a continuation-in-part of application Ser. No. 872,359, filed Oct. 29, 1969, and application Ser. No. 648,228, filed on June 23, 1967, both of which are now abandoned.

Imparting fire-retardant properties to polyurethane foam is becoming more and more important with the increasing uses to which the foam is being put and with the increasing structural requirements that are called for in such uses. One method of imparting fire-retardancy is to employ, in making the foam, a chlorinated polyether polyol produced by oxyalkylating a polyhydroxy compound with 4,4,4-trichloro-1,2-epoxybutane. This is disclosed for example in U.S. Pat. No. 3,269,961 and No. 3,741,921. The present invention relates to an improvement in the art of using this chlorinated epoxide as an intermediate in making polyurethane foam.

The compound 4,4,4-trichloro-1,2-epoxybutane, hereinafter referred to as "TCBO," is conventionally prepared by dehydrohalogenating a 4,4,4-trichloro-2-halobutanol such as 2,4,4,4-tetrachlorobutanol. The resulting reaction product mixture, which contains substantial amounts of impurities, is then subjected to purification in order to enable utilizing the TCBO as an intermediate in making polyurethane foam. In order to prevent decomposition or substantial losses of TCBO, the purification is accomplished by fractional distillation under vacuum. Along with being a costly operation, requiring the use of costly fractionation equipment, this purification step is time-consuming, results in a reduced yield of usable product, and it requires taking costly precautionary measures for purposes of safety.

Now it has been found, in accordance with this invention, that the crude TCBO product, which contains at least 10% of impurities and which is obtained from the dehydrohalogenation of a 4,4,4-trichloro-2-halobutanol, can be used in its entirety as an oxyalkylation agent in the preparation of chlorinated polyether polyols for use in making flame-retardant polyurethane foam. Surprisingly, the resulting foam has at least an equal, and in some instances higher, degree of flame retardancy as a foam prepared from pure-TCBO-derived polyols. It is also surprising that the cell structure of the resulting foam is not affected by using the crude TCBO. In some instances, in fact, the foam has been found to have improved physical properties. Furthermore, polyether polyols prepared from the crude TCBO are generally less viscous, and therefore easier to handle, than similar polyether polyols prepared from pure TCBO. Thus following the teachings of the invention, a costly and dangerous step is eliminated, a higher yield of usable TCBO product is obtained, and viscosity problems are reduced in the preparation of TCBO-derived polyether polyurethane foam having highly desirable fire-retardant and other physical properties.

In the above-mentioned method of peparing TCBO, the reaction proceeds in accordance with the following equation wherein X is halogen, i.e., chlorine, bromine, fluorine or iodine,

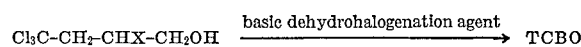

$$Cl_3C\text{-}CH_2\text{-}CHX\text{-}CH_2OH \xrightarrow{\text{basic dehydrohalogenation agent}} TCBO$$

Exemplificative of the halogenated alcohols employed as starting materials in the process of this invention are 2,4,4,4-tetrachlorobutanol; 2-bromo-4,4,4-trichlorobutanol; 2-fluoro-4,4,4-trichlorobutanol; etc. These halogenated alcohols are generally known materials and are readily provided by a variety of techniques. The preferred halogenated alcohols are 2,4,4,4-tetrachlorobutanol and 2-bromo-4,4,4-trichlorobutanol, the 2,4,4,4-tetrachlorobutanol being most preferred.

A wide variety of basic dehydrohalogenation agents can be employed in the above reaction, with the proviso that the basic dehydrohalogenation agent must be at least partially soluble in water. Thus, for example, alkali and alkaline earth metal hydroxides, carbonates, oxides, etc. can be utilized. Alkoxides such as sodium ethoxide, potassium 5-butoxide, etc. and tertiary amines such as pyridine, triethylamine, N-methylpiperidine, triethylenediamine, etc. are also suitable for use in the above reaction. However, it is preferred to employ an alkali metal hydroxide such as sodium hydroxide, and potassium hydroxide, or an alkaline with metal hydroxide such as calcium hydroxide, the alkali metal hydroxides being most preferred. These hydroxides are usually employed in the form of aqueous solutions of varying concentrations, such as from about 0.5 to about 60, preferably about 6–30, and more preferably about 2–12, percent by weight of the hydroxide.

Any suitable proportion of the basic dehydrohalogenation agent solution may be employed for reaction with the 4,4,4-trichloro-2-halobutanol. However, it is preferred to employ at least a stoichiometric amount of the dehydrohalogenation agent in order to achieve maximum conversion of the tetrahalogenated butanol to TCBO. Accordingly in practice from about 1 to about 1.6 times the stoichiometric amount of dehydrohalogenation agent is employed. Thus for example in the case of alkali metal hydroxides, an aqueous solution thereof is used in such a proportion as to provide preferably from about 1 to about 1.6, and more preferably about from about 1.1 to about 1.4, moles of alkali metal hydroxides per every mole of 4,4,4-trichloro-2-halobutanol.

The dehydrohalogenation reaction may be carried out in the presence or absence of an organic solvent. When such a solvent is used, it is preferred to employ one which is inert, is a solvent for the TCBO, and is water-immiscible. Illustrative of such a solvent are the chlorinated hydrocarbons such as chloroform, carbon tetrachloride, and methylene chloride. However, it is preferred to carry out the reaction in the substantial absence of organic solvents.

The pressure under which the reaction is carried out is not critical. Thus any suitable pressure may be employed. However, for convenience and cost economy, it is preferred to effect the reaction at about atmospheric pressure.

The dehydrohalogenation reaction is preferably carried out at a temperature below about 65° C. such as from about 35 to about 62° C. and more preferably from about 40 to about 55° C.

When the reaction is completed, two layers are obtained, namely, an aqueous layer containing hydrohalic acid and used dehydrohalogenation agent, and a non-aqueous or organic phase containg crude TCBO and possibly volatile components, i.e., organic solvent, if such is used in the dehydrohalogenation reaction, and possibly small proportions of other volatile components which have a lower boiling point than pure TCBO. The phases are then separated by any suitable means such as a separatory funnel. Finally removal of substantially all the volatiles in the organic phase is achieved by suitable means, such as evaporation, in order to obtain a crude TCBO product containing no more than about 5% and preferably less than about 4%, by weight of volatile components. It is to be understood that the term "volatile components" as used in the specification and claims herein is intended to encompass all materials which have a boiling point, at atmospheric pressure, below 200° C.

The crude TCBO product, which contains at most 90%, and usually between about 58% and about 85%, by weight of pure TCBO is used as is according to the invention. The impurities in the crude mixture thus amount to at least 10%, and usually between about 15% and about 42%, by weight. These impurities comprise a major proportion, i.e., over about 50% by weight, of unidentified high boiling by-products along with varying but relatively small proportions of unreacted 4,4,4-trichloro-2-halobutanol and other impurities. In utilizing the crude TCBO according to the invention, especially advantageous results obtain by using a crude TCBO mixture containing about 20–33% by weight of impurities and, correspondingly, about 80–67% by weight of pure TCBO.

In accordance with the most preferred embodiments of the invention, the crude TCBO is prepared by a process which consists essentially of the following steps:

(1) Reacting, at about atmospheric pressure and a temperature of about 40–55° C. 2,4,4,4-tetrachlorobutanol with an aqueous solution of sodium hydroxide or potassium hydroxide in such a proportion as to provide from about 1.1 to about 1.4 moles of the hydroxide per every mole of 2,4,4,4-tetrachlorobutanol, thereby forming a two-phase reaction product mixture, namely, an aqueous phase consisting essentially of water, sodium or potassium hydroxide, hydrochloric acid and sodium or potassium chloride, and a non-aqueous phase consisting essentially of crude TCBO, and (2) Separating the two phases and recovering the crude TCBO phase substantially free, i.e., containing less than about 4% by weight, of volatile components.

In utilizing the crude TCBO to prepare chlorinated polyether polyols for use according to the invention, conventional oxyalkylation methods are employed. Thus the chlorinated polyether polyols can be prepared by reacting the crude TCBO with a polyhydroxy initiator in the presence of a basic or an acidic reaction catalyst. Any polyhydroxy compound, or mixtures of such compounds, may be employed as the initiator. Illustrative initiators include the polyhydroxy alkanes, such as ethylene glycol, propylene glycol, glycerol, trimethylolpropane, pentaerythritol, sorbitol, mannitol, and the like; the carbohydrates and carbohydrate derivatives, such as sucrose, a mixture of sucrose and water, a mixture of sucrose and a polyhydric alcohol, dextrose, a mixture of dextrose and water, a mixture of dextrose and a polyhydric alcohol, methyl glucoside, ethyl glucoside, ethylene glycol glucoside, glycerol glucoside, fructose, starch, partially hydrolyzed starch and the like; and the polyalkylene ether glycols such as polyethylene ether glycol and polytetramethylene ether glycol. It is preferred, however, to employ a polyhydroxy compound comprising a carbohydrate or a carbohydrate derivative such as illustrated above. Particularly preferred are mixtures of sucrose or dextrose with water and/or a polyhydric aliphatic alcohol. As used in the specification and claims herein, the term "dextrose" is intended to include both the hydrous as well as the anhydrous material.

If desired, varying proportions of a non-halogenated alkylene oxide, such as ethylene oxide, propylene oxide and butylene oxide, may also be employed in the preparation of the chlorinated polyether polyol. Such a non-halogenated alkylene oxide may be added and reacted with the polyhydroxy initiator before, concurrently with, or after the addition of the crude TCBO.

The basic catalysts employed in the preparation of the chlorinated polyther polyols include sodium hydroxide, potassium hydroxide, sodium bicarbonate, sodium methylate, and the like. Suitable acidic catalysts include any organic, inorganic, or so-called Lewis acid catalyst. In the preferred embodiment of the invention, a Lewis acid, such as boron trifluoride etherate, is employed.

The reaction between the crude TCBO and the polyhydroxy initiator is usually carried out at a temperature of about 50–130° C. until a chlorinated polyether polyol having the desired hydroxyl number is obtained, at which time the reaction is stopped and the product polyol recovered. Before utilizing this polyol in polyurethane foam production according to the invention, it is preferred to subject it to a conventional stripping operation in order to remove any volatile materials, such as water, that may be contained therein.

As used in practicing the process of the invention, the chlorinated polyether polyol may have a hydroxyl number from about 30 to about 800, depending on the ratio of total epoxide used in preparing it to the polyhydroxy initiator. And as is well known in the art, depending on the hydroxyl number of the polyether polyol which is used in making polyurethane foam, such foam can be rigid, semi-rigid or flexible. Generally, flexible foams are obtained using a polyether polyol having a hydroxyl number of about 30–60; semi-rigid foams obtain from a polyether polyol having a hydroxyl number of about 75–175; and to make rigid foam, a polyether polyol having a hydroxyl number of about 175–800 is employed. According to the preferred embodiments of the invention, rigid polyurethane foams are prepared using a chlorinated polyether polyol having a hydroxyl within the specified range of about 175–800 and more preferably about 250–550.

The polyurethane foams of the invention are prepared by reacting the crude TCBO-derived polyether polyols, alone or admixed with other polyols, with an organic polyisocyanate in the presence of a foaming agent and a reaction catalyst.

Any of the widely known organic polyisocyanates can be employed in the preparation of the polyurethane foams of the invention. Illustrative polyisocyanates include toluylene diisocyanate, methyl - bis - (4 - phenylisocyanate), 3,3' - bitoluylene 4,4' - diisocyanate, 3,3' - dimethoxy-4,4-biphenylene diisocyanate, naphthylene-1,5-diisocyanate, hexamethylene diisocyanate, the polymeric isocyanates such as polyphenylene polymethylene isocyanate, mixtures thereof and the like. The preferred polyisocyanates are toluene diisocyanates and the polymeric isocyanates. The amount of isocyanate employed in the preparation of the polyurethane foams should be sufficient to provide at least about 0.7 NCO group per hydroxyl group present in the foam-forming reaction system. While an excess of isocyanate compound may be used, this is generally undesirable due to the relatively high cost of the polyisocyanates. It is preferably, therefore, to employ sufficient isocyanate to provide no greater than about 1.5 NCO groups, and more preferably between about 0.9 and 1.1 NCO groups, per hydroxyl group.

The foaming agent employed in preparing the polyurethane foams can be any one of those known in the art to be useful for this purpose such as water, the halogenated hydrocarbons, and mixtures thereof. Typical halogenated hydrocarbon foaming agents include monofluorotrichloromethane, difluorodichlormethane, the trichlorotrifluoroethanes, methylene chloride, chloroform, and carbon tetrachloride. The amount of foaming agent, or mixture of foaming agents employed can be varied over a wide range. Generally, however, the halogenated hydrocarbons are employed in an amount ranging from about 1 to about 50 parts by weight per 100 parts of the polyether polyol; and generally water is employed in an amount ranging from about 0.1 to about 10 parts by weight per 100 parts of the polyether polyol.

Any of the catalysts, or mixtures thereof, known in the art to catalyze the polyurethane foam-forming reaction may be employed in preparing the foams of the invention. These include the tertiary amines, such as N-methylmorpholiene and triethylene diamine, and the oragnic metal salts such as stannous octoate and dibutyltin dilaurate. Generally the catalyst is employed in an amount ranging between about 0.05 and about 3.0, preferably between about 0.075 and about 2.0, percent by weight of the polyether polyol.

It is preferred in the preparation of the polyurethane foams of the invention to employ minor amounts of a conventional polyurethane foam surfactant. Typical such surfactants are the silicone oils and soaps which are usually employed in an amount ranging up to about 2 parts by weight per 100 parts of the polyether polyol.

Various additives may also be incorporated in the polyurethane foam-forming reaction mixture, such as fillers, e.g., clay, dyes, plasticizers, deodorants, and anti-oxidants.

In preparing the polyurethane foam, either the "one-shot" method of reaction or the so-called "prepolymer" technique may be employed.

Several advantages are obtained by utilizing the improved process of the invention in preparing flame retardant polyurethane foam from a TCBO-based polyether polyol. First a costly and hazardous operation for purifying the crude TCBO is eliminated. Secondly, further economy is achieved by making more efficent use of the product of dehydrohalogenating 4,4,4-trichloro-2-butanol. Thirdly, in the case of polyether polyols derived from a carbohydrate or carbohydrate derivative, a substantial reduction in viscosity is achieved which makes for easier processing and better control of the foaming operation. Finally, polyurethane foams prepared according to the invention have comparable, and in some instances superior, properties to foams prepared from pure-TCBO-derived polyether polyols. They are highly flame retardant. In fact, rigid foams of the invention which are derived from a dextrose-based initiator, for example, have a higher degree of flame retardancy as a result of using a crude TCBO in making the polyether. The foams of the invention also have excellent cell structure and other desirable physical properties which make them highly desirable for use in various structural applications.

The following examples are provided to illustrate the invention. In these examples, all parts and percentages are by weight unless otherwise specified.

EXAMPLE 1

(A) Preparation of the crude epoxide

The amount of 4,864 g. of a carbon tetrachloride solution containing 28 percent by weight of 2,4,4,4-tetrachlorobutanol was heated to 60° C. in a 12-liter flask. Aqueous 4 percent sodium hydroxide solution (7.5 liters) was added with stirring to the tetrachlorobutanol solution over a period of 115 minutes. Upon addition of the aqueous base, a two-phase system appeared. The reaction mixture was maintained at about 60° C. while being stirred for an additional 25 minutes. After cooling to room temperature, the layers were separated and the water phase was washed with 100 ml. of carbon tetrachloride. The organic phases were combined and stripped at 100° C./50 mm. Hg to remove the carbon tetrachloride, thereby providing 1,275 g. of crude product. Vapor phase chromatography revealed that the product contained approximately 73 percent TCBO, 5 percent tetrachlorobutanol, 2 percent dichloroepoxybutane, 20 percent unidentified high boiling by-products and less than 1 percent carbon tetrachloride.

(B) Preparation of the chlorinated polyether polyol

The crude TCBO mixture described above was employed to prepare an oxyalkylated polyol in the following manner. Boron trifluoride etherate (1.1 parts) and water (100 parts) were charged to a reactor containing 342 parts of surcrose. Heat was applied and the temperature of the mixture increased to 70° C. Ethylene oxide (110 parts) was added while maintaining a temperature of 50°–70° C. The volatiles, mainly water, were stripped at 75°–80° C./3 mm. Hg. More boron trifluoride etherate (2.3 parts) and 1,095 parts of the crude TCBO were added to the reaction mixture while maintaining a temperature of 80° C. Upon completion of the reaction, the resulting polyol had a hydroxyl number of 276 mg. KOH/gm. and a viscosity of 89,600 cps. at 31° C.

(C) Preparation of polyurethane foam

To 100 parts of the polyol described above were added 2.5 parts of N,N,N'-tetramethylbutanediamine, 26 parts of trichloromonofluoromethane and 2.0 parts of siloxane-oxyalkylene block copolymer surfactant having the following general formula:

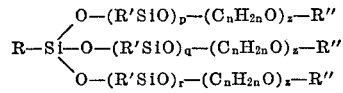

wherein R, R' and R" are $C_{1-8}$ alkyl radicals; $p$, $q$ and $r$ are each 2 to 15 and $-(C_nH_{2n}O)-$ is a polyoxyethylene-polyoxypropylene block containing from 10 to 50 of each oxyalkylene unit. The mixture was stirred until homogeneous. Then 70.5 parts of polyphenylene polymethylene isocyanate were added. After stirring, the mixture was poured into a rectangular box. Creaming of the mixture was observed after 13 seconds. After 85 seconds the foam had risen to its maximum height, and a tack-free foam was obtained after an additional 80 seconds. The foam had excellent physical properties as set forth in Table I below.

(D) Comparison with the pure epoxide

For purposes of comparison, a polyol was made following the procedure of Example 1(B), with the exception that 1,147 parts of pure, distilled TCBO were employed in place of the crude material. The resulting polyol was very viscous (2,000,000 cps. at 29° C.) and difficult to process. It had a hydroxyl number of 279 mg. KOH/ gm. A foam was prepared from this polyol following the procedure of Example 1(C) and employing 100 parts of the polyol, 1.5 parts of the above-described siloxaneoxyalkylene block copolymer surfactant, 1.5 parts of N,N,N',N'-tetramethylbutanediamine, 26 parts of trichloromonofluoromethane and 75 parts of polyphenylene polymethylene isocyanate. A cream time of 18 seconds, a rise time of 121 seconds and a tack time of 111 seconds were observed. The properties of this polyurethane foam are set forth in Table I below.

ing at 75° C. and a pressure of 5 mm. of mercury. The resulting polyether polyol had a hydroxyl number of 334,

TABLE I.—FOAM PHYSICAL DATA

| Polyether used | Density, lbs./cu. ft. | Compressive strength, lbs./sq. in. | | Flame test [1] | Torch test,[2] min. | Humid aging [3] | | |
|---|---|---|---|---|---|---|---|---|
| | | Parallel | Perpendicular | | | 1 day | 2 days | 7 days |
| Sucrose-ethylene oxide-crude TCBO | 1.94 | 35.4 | 16.2 | NB | 13:36 | 8.5 | 9.3 | 10.0 |
| Sucrose-ethylene oxide-pure TCBO | 1.94 | 32.8 | 17.8 | NB | 13:00 | 8.4 | 9.8 | 9.9 |

[1] NB means "non-burning" as determined by ASTM D-1692-59 T.
[2] SPI Proposed Tentative Test Method for Flame Penetration Test, Draft 2. Briefly, specimens of foam are cut to a prescribed size, mounted in a Transiste holder with a backing of very rapid filter paper, and subjected to direct contact with a propane flame of specified length and having a temperature between 1,910 to 1,960° F. The average time for the filter paper to become ignited is reported as the measure of flame-resistance of the foam.
[3] Humid aging at 158° F. and 100 percent relative humidity as in ASTM test D-1226 for "Resistance of Rigid Cellular Plastics to Simulated Service Conditions." The data represents the percent change in volume after being maintained under the prescribed conditions for the specified number of days.

Thus as seen from Example I and the data in Table I, using the crude TCBO, along with eliminating an expensive and hazardous purification step, has the added advantage of producing a polyol which is much less viscous and easier to process than the pure TCBO-derived polyol. Yet the properties of the foams prepared from the two polyols are comparable in every respect.

EXAMPLES 2–9

Eight additional runs were made for preparing crude TCBO using similar proportions of reactants, and practically the same reaction conditions, as used in Example 1(A). Samples of the product mixture from each run were analyzed, and the results are shown in Table II below.

TABLE II

| Example number | Percent | | | | |
|---|---|---|---|---|---|
| | TCBO | TCBA [1] | DCBE [2] | UHBB [3] | CCl₄ |
| 2 | 73.5 | 2.1 | 4.5 | 19.7 | 0.2 |
| 3 | 58.5 | 12.3 | 1.4 | 27.8 | 0 |
| 4 | 75.7 | 0.6 | 2.6 | 20.4 | 0.7 |
| 5 | 64.5 | 1.9 | 3.6 | 30.0 | 0 |
| 6 | 71.2 | 1.0 | 3.2 | 24.6 | 0 |
| 7 | 69.0 | 3.6 | 6.1 | 21.3 | 0 |
| 8 | 74.0 | 4.1 | 3.1 | 17.2 | 1.6 |
| 9 | 71.6 | 5.8 | 2.2 | 20.0 | 0.4 |

[1] TCBA stands for 2,4,4,4-tetrachlorobutanol.
[2] DCBE stands for 4,4-dichloro-1,2-epoxybutane.
[3] UHBB stands for unidentified high boiling by-products.

In the case of each of Examples 2 through 9, the product mixture was successfully utilized in preparing a chlorinated polyether polyol, as illustrated in Example 1(B) above, and a fire-retardant polyurethane foam therefrom as illustrated in Example 1(C) above. The resulting foam, in each case, again possessed essentially the same characteristics as that of the foam prepared using the pure chlorinated epoxide intermediate.

EXAMPLE 10

A crude TCBO mixture, prepared in the manner described in Example 1(A) and containing 75% pure TCBO, was utilized to prepare a chlorinated polyether polyol in the following manner. To a mixture of 62 g. of ethylene glycol and 3 ml. of boron trifluoride etherate were added 180 g. of anhydrous dextrose. The mixture was heated to about 85° C. with stirring, and 858 g. of the crude TCBO were then blended in while maintaining the temperature at about 85–90° C. After a total reaction time of about 5½ hours, the reaction product was neutralized with sodium hydroxide and the volatiles were removed by heating at 75° C. and a pressure of 5 mm. of mercury. The resulting polyether polyol had a hydroxyl number of 334, a chlorine content of 47% and a viscosity, at 25° C., of 328,000 cps.

The above polyether polyol was used to prepare a polyurethane foam. The following ingredients, in the indicated proportions, were employed:

Ingredients:                                         Parts by weight
Polyether polyol (as prepared above) _____ 100
N,N,N'-tetramethylbutanediamine _____ 2.0
Monofluorotrichloromethane _____ 20
Polymethylene polyphenylene isocyanate _____ 84
Surfactant* _____ 2.0

*Dow Corning silicone surfactant DC–193.

The resulting foam had good cell structure and the following other properties:

Density _____ 1.94 lbs./cu. ft.
Compressive strength:
  Parallel _____ 29.4 lbs./sq. in.
  Perpendicular _____ 15.8 lbs./sq. in.
Flame test (according to ASTM
  D–1692–59T) _____ NB (rated non-burning).
Torch test (SPI) _____ 23 minutes.
Humid aging at 158° F. and
  100% relative humidity (according to ASTM D–2126):
  After 1 day _____ 6.0% volume change.
  After 2 days _____ 6.5% volume change.
  After 7 days _____ 7.9% volume change.

EXAMPLE 11

A crude TCBO mixture, prepared in the manner described in Example 1(A) and containing 75% pure TCBO, was utilized to prepare a chlorinated polyether polyol in the following manner. To a mixture of 62 g. of ethylene glycol and 3 ml. of boron trifluoride etherate were added 198 g. of d-glucose monohydrate. The mixture was heated to about 85° C. with stirring, and 835 g. of the crude TCBO were blended in, while maintaining the reaction mixture at a temperature of about 85–90° C. When the reaction was completed, the product was neutralized with sodium hydroxide and the volatiles were removed by heating to 75° C. at a pressure of 5 mm. of mercury. The product polyol had a hydroxyl number of 356, a chlorine content of 40%, and a viscosity of 150,000 cps., at 25° C.

For purposes of comparison, the same procedure described above was used to prepare a polyether polyol employing 888 grams of pure TCBO instead of 835 grams of crude TCBO. The resulting polyol had a hydroxyl number of 384, a chlorine content of 46%, and a viscosity, at 25° C. of 1,406,000 cps.

Polyurethane foams were prepared from both polyether polyols using essentially the same reaction conditions and the same isocyanate, catalyst, blowing agent and surfactant. The resulting foam in each case had good cell structure. Other properties of the foam are provided in Table III below.

TABLE III.—FOAM PHYSICAL DATA

| Polyether | Density (lbs./cu. ft.) | Compressive strength (lbs./sq. in.) | | Tunnel test* | Humid aging | | |
|---|---|---|---|---|---|---|---|
| | | Parallel | Perpendicular | | 1 day | 2 days | 7 days |
| Glucose-ethylene glycol-crude TCBO | 2.02 | 36.3 | 20.2 | 21 | 8.8 | 8.3 | 10.5 |
| Glucose-ethylene glycol-pure TCBO | 2.01 | 35.5 | 14.5 | 30 | 1.2 | 2.2 | 5.6 |

*The Tunnel Test is a simplified method of measuring the fire-retardancy of a material, according to ASTM E-84. Briefly, a standard sample, 30 inches long, is placed in a 30-degree inclined tunnel and one end of it is ignited. The flame spread in the sample is then measured and a rating is given to the material based on standard ratings of 0 for asbestos-cement and 100 for red oak.

As seen from the data in Table III, the two foams had comparable physical properties with the foam prepared from the crude TCBO-derived polyol having a better Tunnel Test rating and therefore a higher degree of flame retardancy.

EXAMPLE 12

A crude TCBO mixture, prepared according to the procedure described in Example 1(A) and containing 66.7% pure TCBO was utilized to prepare a chlorinated polyether polyol in the following manner. To a mixture of 62 g. of ethylene glycol and 3 ml. of boron trifluoride etherate, there were added 198 g. of d-glucose monohydrate. The mixture was heated to about 85° C. with stirring. Then 220 g. of propylene oxide and 647 g. of the crude TCBO were blended in while maintaining the reaction mixture at about 85–90° C. After about 5½ hours of reaction time, the resulting product was neutralized with sodium hydroxide and the volatiles were removed by heating to 75° C. at a pressure of 5 mm. of mercury. The product polyol had a hydroxyl number of 420, a chlorine content of 35% and a viscosity, at 25° C., of 26,400 cps.

A polyurethane foam was prepared from this polyol using the same reaction conditions and the same isocyanate, catalyst, blowing agent and surfactant as used in Example 10 above. The resulting foam had excellent cell structure and the following other properties:

Density _____ 2.02 lbs./cu. ft.
Compressive strength:
  Parallel _____ 38.1 lbs./sq. in.
  Perpendicular _____ 20.0 lbs./sq. in.
Tunnel Test (according to ASTM E-84) _____ 41.
Humid aging at 158° F. and 100% relative humidity (according to ASTM D-2126):
  After 1 day _____ 6.1% volume change.
  After 2 days _____ 6.5% volume change.
  After 7 days _____ 8.0% volume change.

What is claimed is:

1. In a process for preparing a polyurethane foam by reacting a polyether polyol with an organic polyisocyanate in the presence of a reaction catalyst and a foaming agent, said polyether polyol comprising the product of reacting 4,4,4 - trichloro - 1,2 - epoxybutane with a mixture of (1) dextrose and (2) water, a polyhydric aliphatic alcohol or a mixture of water and a polyhydric aliphatic alcohol, the improvement which comprises using said epoxybutane as a crude material having no more than about 5% by weight of volatile components and containing from about 15 to about 42% by weight of impurities and correspondingly from about 85 to about 58% of said epoxybutane, said crude epoxybutane being prepared by a process consisting essentially of
  (a) reacting, at a temperature from about 35 to about 62° C., 4,4,4-trichloro-2-halobutanol with an aqueous solution of an alkali metal hydroxide or an alkaline earth metal hydroxide, said aqueous solution being employed in a sufficient proportion to provide at least a stoichiometric amount of hydroxide which is required to react with said 4,4,4 - trichloro - 2 - halobutanol, thereby forming a two-phase reaction product mixture, namely, an aqueous phase and a non-aqueous phase containing said crude epoxybutane, and
  (b) separating said two phases and recovering said crude epoxybutane.

2. The process of claim 1 wherein a mixture of dextrose and a polyhydric aliphatic alcohol is employed.

3. The process of claim 1 wherein an alkali metal hydroxide, selected from sodium hydroxide and potassium hydroxide, is employed and further wherein said 4,4,4, - trichloro - 2 - halobutanol is 2,4,4,4 - tetrachlorobutanol.

4. The process of claim 3 wherein the concentration of said alkali metal hydroxide in said aqueous solution ranges from about 0.5 to about 60% by weight.

5. The process of claim 4 wherein said aqueous solution is employed in a proportion which is sufficient to provide from about 1 to about 1.6 moles of said alkali metal hydroxide per every mole of said 2,4,4,4 - tetrachlorobutanol.

6. The process of claim 5 wherein said foam is a rigid foam and said polyether polyol has a hydroxyl number of 250–550.

7. The process of claim 6 wherein said crude epoxybutane contains about 20–33% by weight of impurities and correspondingly about 80–67% of said epoxybutane.

8. The process of claim 7 wherein the reaction for preparing said crude epoxybutane is carried out at atmospheric pressure and a temperature of about 40–55° C.

9. The process of claim 8 wherein a mixture of dextrose and a polyhydric aliphatic alcohol is employed.

10. The process of claim 9 wherein the reaction between said crude epoxybutane and said mixture of dextrose and a polyhydric aliphatic alcohol is carried out in the presence of a Lewis acid catalyst.

11. The process of claim 10 wherein said crude epoxybutane contains less than about 4% by weight of volatile components and further wherein said aqueous solution has a concentration of said alkali metal hydroxide ranging from about 6 to about 30% by weight.

12. The process of claim 11 wherein said alkali metal hydroxide is sodium hydroxide.

13. The process of claim 12 wherein said Lewis acid catalyst is boron trifluoride etherate.

14. The process of claim 13 wherein said polyhydric alcohol is ethylene glycol.

15. The process of claim 14 wherein said foaming agent is an organic foaming agent and the reaction between said polyether polyol and said organic polyisocyanate is carried out in the presence of a surfactant.

References Cited

UNITED STATES PATENTS 3,741,921  6/1973  Lapkin _____ 260—2.5
3,269,961  8/1966  Bruson et al. _____ 260—2.5

DONALD E. CZAJA, Primary Examiner

E. C. RZUCIDLO, Assistant Examiner

U.S. Cl. X.R.
260—2.5 AJ, 2.5 AP